US011333127B2

(12) United States Patent
Kratmann et al.

(10) Patent No.: US 11,333,127 B2
(45) Date of Patent: May 17, 2022

(54) PROTECTIVE COVER FOR PROTECTING A LEADING EDGE OF A WIND TURBINE BLADE

(71) Applicant: Siemens Gamesa Renewable Energy A/S, Brande (DK)

(72) Inventors: Kasper Koops Kratmann, Horsens (DK); Oriol Ferret Gasch, Vejle (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 16/287,293

(22) Filed: Feb. 27, 2019

(65) Prior Publication Data

US 2019/0277247 A1 Sep. 12, 2019

(30) Foreign Application Priority Data

Mar. 8, 2018 (EP) .................................... 18160747

(51) Int. Cl.
*F03D 1/06* (2006.01)
*F03D 80/00* (2016.01)
*F03D 80/50* (2016.01)
(52) U.S. Cl.
CPC ........... *F03D 1/0675* (2013.01); *F03D 80/00* (2016.05); *F03D 80/50* (2016.05); *F05B 2230/00* (2013.01);
(Continued)
(58) Field of Classification Search
CPC ...... F03D 1/0675; F03D 1/0683; F03D 80/00; F03D 80/50; F05B 2230/00;
(Continued)

(56) References Cited

U.S. PATENT DOCUMENTS 3,999,888 A * 12/1976 Zincone ................ B64C 27/008
416/145
4,895,491 A * 1/1990 Cross .................... F04D 29/388
244/123.9
(Continued)

FOREIGN PATENT DOCUMENTS

CN 201786551 U 4/2011
CN 102448711 A 5/2012
(Continued)

OTHER PUBLICATIONS

Japanese Office Action dated Mar. 2, 2020 for Application No. 2019-041469.
(Continued)

*Primary Examiner* — David E Sosnowski
*Assistant Examiner* — Wayne A Lambert
(74) *Attorney, Agent, or Firm* — Schmeiser, Olsen & Watts LLP

(57) ABSTRACT

A protective cover for a leading-edge of a wind turbine rotor blade is provided. The protective cover is pre-formed into a curved shape to accommodate at least a part of a leading-edge section including the leading-edge of the wind turbine rotor blade to be protected. The protective cover includes a pressure side section, a suction side section and a centerline in-between the pressure side section and the suction side section. The centerline runs in longitudinal direction of the protective cover. Thickness of the protective cover in a cross section of the protective cover in transverse direction has a thickness distribution corresponding to a standardized normal distribution.

13 Claims, 4 Drawing Sheets

Figure 1:
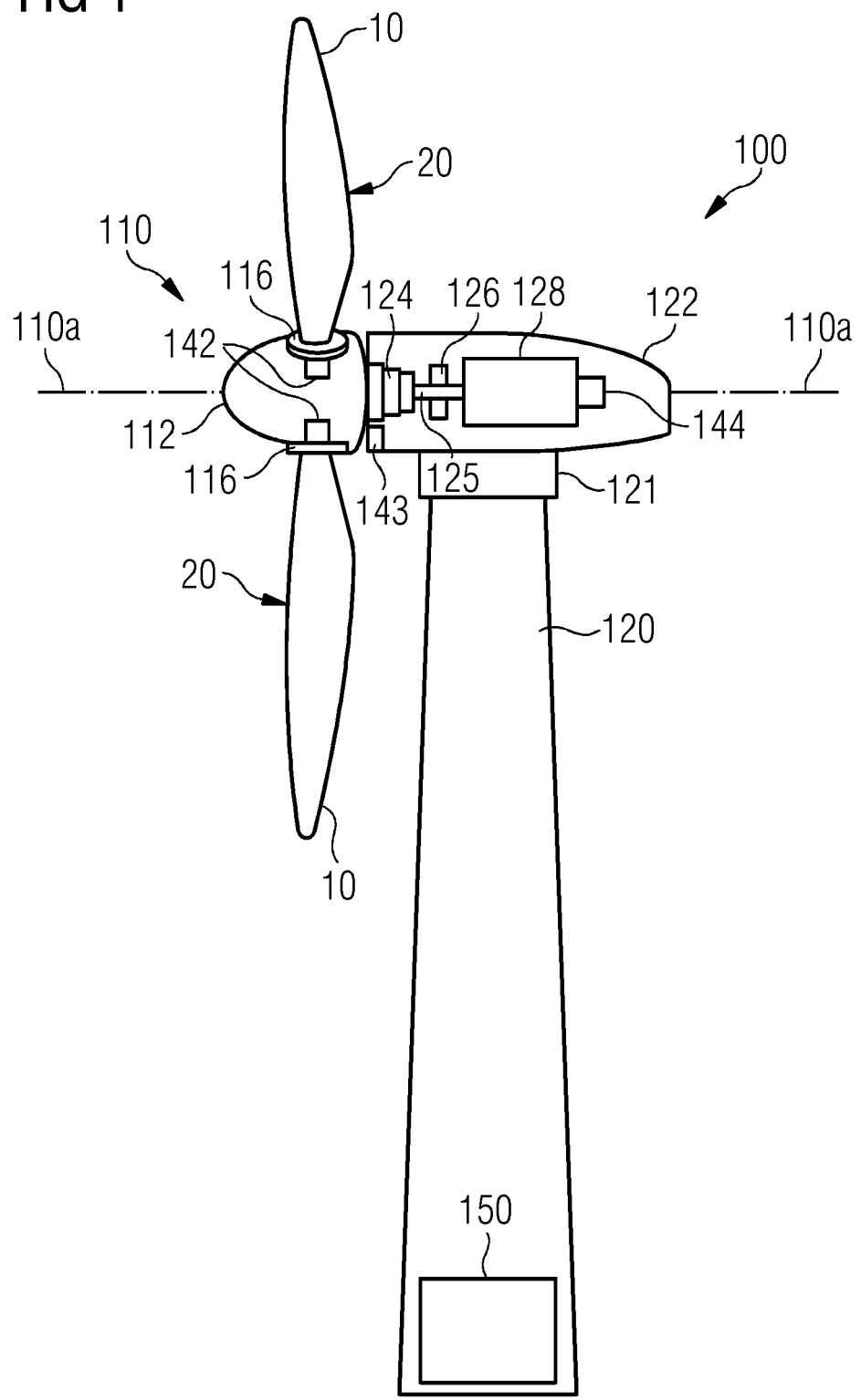

(52) U.S. Cl.
CPC ..... *F05B 2240/221* (2013.01); *F05B 2240/30* (2013.01); *F05B 2250/73* (2013.01); *F05B 2260/95* (2013.01); *F05B 2280/6015* (2013.01)

(58) Field of Classification Search
CPC ............ F05B 2240/30; F05B 2240/301; F05B 2240/221; F05B 2250/73; F05B 2260/95; F05B 2280/6015; F05D 2240/303
See application file for complete search history.

(56) References Cited

U.S. PATENT DOCUMENTS

| | | | | |
|---|---|---|---|---|
| 5,165,859 A | * | 11/1992 | Monroe | F04D 29/289 |
| | | | | 416/224 |
| 5,306,120 A | * | 4/1994 | Hammer | C23C 4/02 |
| | | | | 416/224 |
| 5,486,096 A | * | 1/1996 | Hertel | F01D 5/288 |
| | | | | 416/224 |
| 5,782,607 A | * | 7/1998 | Smith | C25D 7/00 |
| | | | | 416/224 |
| 5,908,522 A | * | 6/1999 | Lofstrom | B64C 11/205 |
| | | | | 156/94 |
| 8,425,196 B2 | | 4/2013 | Fritz | B29C 65/48 |
| | | | | 416/229 R |
| 8,800,145 B2 | * | 8/2014 | Mukherji | B23P 6/00 |
| | | | | 29/402.11 |
| 9,494,134 B2 | * | 11/2016 | Kinzie | F03D 1/0675 |
| 2007/0036659 A1 | * | 2/2007 | Hibbard | B29C 66/1282 |
| | | | | 416/233 |
| 2008/0107540 A1 | * | 5/2008 | Bonnet | F03D 1/0675 |
| | | | | 416/229 R |
| 2011/0142678 A1 | * | 6/2011 | Santiago | F03D 1/0675 |
| | | | | 416/241 R |
| 2012/0034094 A1 | | 2/2012 | Wansink | |
| 2013/0045105 A1 | * | 2/2013 | Driver | F03D 1/0675 |
| | | | | 416/224 |
| 2013/0101426 A1 | * | 4/2013 | Saitou | F03D 1/0675 |
| | | | | 416/224 |
| 2015/0064015 A1 | | 3/2015 | Perez | |
| 2015/0132140 A1 | * | 5/2015 | Haag | F01D 5/286 |
| | | | | 416/224 |
| 2016/0258297 A1 | | 9/2016 | Cortequisse | |
| 2017/0191368 A1 | | 7/2017 | Dujol et al. | |
| 2017/0314532 A1 | | 11/2017 | Kirkegaard et al. | |
| 2018/0209400 A1 | * | 7/2018 | Drachmann Haag | B32B 37/24 |
| 2018/0230966 A1 | * | 8/2018 | Drachmann Haag | B29C 66/721 |
| 2019/0195202 A1 | * | 6/2019 | Kirkegaard | F03D 1/0675 |
| 2019/0226458 A1 | * | 7/2019 | Sanderson | F03D 80/50 |
| 2019/0293050 A1 | * | 9/2019 | Ruijter | F03D 80/50 |
| 2020/0063718 A1 | * | 2/2020 | Ruijter | F03D 1/0683 |

FOREIGN PATENT DOCUMENTS

| | | | | |
|---|---|---|---|---|
| CN | 102536630 A | | 7/2012 | |
| CN | 103097722 A | | 5/2013 | |
| CN | 104420890 A | | 3/2015 | |
| CN | 105937506 A | | 9/2016 | |
| CN | 106194578 A | | 12/2016 | |
| CN | 106470782 A | | 3/2017 | |
| CN | 107207688 A | | 9/2017 | |
| EP | 2497943 A1 | | 9/2012 | |
| EP | 2559891 A2 | | 2/2013 | |
| EP | 3098438 A1 | * | 11/2016 | ........... F03D 1/0675 |
| ES | 2333929 A1 | | 3/2010 | |
| JP | 2006521485 A | | 9/2006 | |
| WO | WO 2004076852 A2 | | 9/2004 | |
| WO | WO-2011098506 A1 | * | 8/2011 | ........... F03D 1/0683 |
| WO | WO 2016189278 A1 | | 12/2016 | |
| WO | 2017012632 A1 | | 1/2017 | |
| WO | 2017114528 A1 | | 7/2017 | |
| WO | WO 2017114528 A1 | | 7/2017 | |

OTHER PUBLICATIONS

Lili, Lu et al.: "Structural designs and statics analysis of 2 MW wind turbine blade"; Materials Science and Technology; Jun. 2017; vol. 25. No. 3.

* cited by examiner

PROTECTIVE COVER FOR PROTECTING A LEADING EDGE OF A WIND TURBINE BLADE

CROSS-REFERENCE TO RELATED APPLICATIONS

This application claims priority to European application No. 18160747.4, having a filing date of Mar. 8, 2018, the entire contents of which are hereby incorporated by reference.

FIELD OF TECHNOLOGY

The following relates generally to wind turbines, and in particular, to a protective cover for protecting a leading-edge of a wind turbine rotor blade from erosion, and to a wind turbine rotor blade comprising such a protective cover.

BACKGROUND

Nowadays rotor or turbine blades e.g. blades for wind, gas or steam turbines are made of fibre reinforced plastic composite materials. Erosion of the leading-edge of such blades is known to occur in operation. Erosion of the leading-edge of a turbine blade may reduce the efficiency of the blade and thus the power output by the turbine.

Wind turbine rotor blades, both of offshore wind turbines and onshore wind turbines, are specially affected by wear which occurs when the blades are impacted by particles or droplets in the ambient wind resulting in degradation of the leading-edge of the wind turbine rotor blade. The particles and droplets are present in the ambient wind and originate from dust, rain, snow-fall, etc and cause erosion of the leading-edge of wind turbine blades by impingement wear resulting into reduction of the blade aerodynamic efficiency and thus the maximum output power of the wind turbine.

Erosion on a turbine blade may penetrate into the structural fibre reinforced laminate leading to severe failure of the turbine blade requiring repair which can be very costly to turbine operators and may involve considerable downtime for the affected wind turbine. This holds especially true for offshore wind turbines because their maintenance costs are extremely high. This is why generally a surface system is foreseen on the leading-edge of wind turbine rotor blades of onshore and offshore wind turbines.

Repair procedures typically include a re-establishment of the surface systems mostly comprising filler and paint. In case of severe degradation, a lamination may be required. Different solutions are used for protecting and/or repairing the leading-edges of composite blades, including adhesive plastic tapes.

EP2497943 A1 discloses a wind turbine blade with an improved surface, wherein a plastic tape is arranged at specific locations of the blade to reinforce the blade surface. The life time of erosion protection tapes will last approximately between 5-8 years, depending on the environmental conditions of the location of the wind turbine, as well as the turbine operating conditions. In general, an erosion protection tape will rupture due to heavy erosion, causing the layer left on the rotor blade to freely flutter in the wind. This fluttering will result in a loss of aerodynamic performance of the blade, as well as in the generation of noise.

Other solutions suggest erosion protection coatings applied by brush, roller, spatula or spray can. Generally, such coatings have to be applied at a certain humidity level and within a special temperature window, e.g. 20 and 25 degree Celsius. Thus, these solutions may not be used in the field, e.g. at offshore wind farms or at wind turbine locations are that are generally cooler or hotter than the special temperature window.

Further solutions suggest attaching a protective cap made of a polymer material to the forefront of a wind turbine blade during manufacturing of the blade. One drawback of the conventionally known protective cap, and of the tape and the paint applied in thick layers onto the leading-edge of the rotor blade as mentioned hereinabove, is that the addition of the protective cap or shell influences the aerodynamic performance and properties of the wind turbine blade. Adding material and changing the geometry of the leading-edge, either as a protective shell or as layers of paint or tape, is a delicate matter as the airflow over and about the leading-edge easily gets disturbed as a result of the addition, thereby influencing the flow over airfoil, potentially resulting in significant loss of aerodynamic performance, which eventually is leads to loss of annual energy production of the wind turbine.

SUMMARY

An aspect relates to a protective cover, also referred hereinafter to as a protective shell, which provides protection to the leading-edge while maintaining and exhibiting the aerodynamic properties of the wind turbine rotor blade on which the protective shell of embodiments of the invention is mounted.

BRIEF DESCRIPTION

Figure 2:
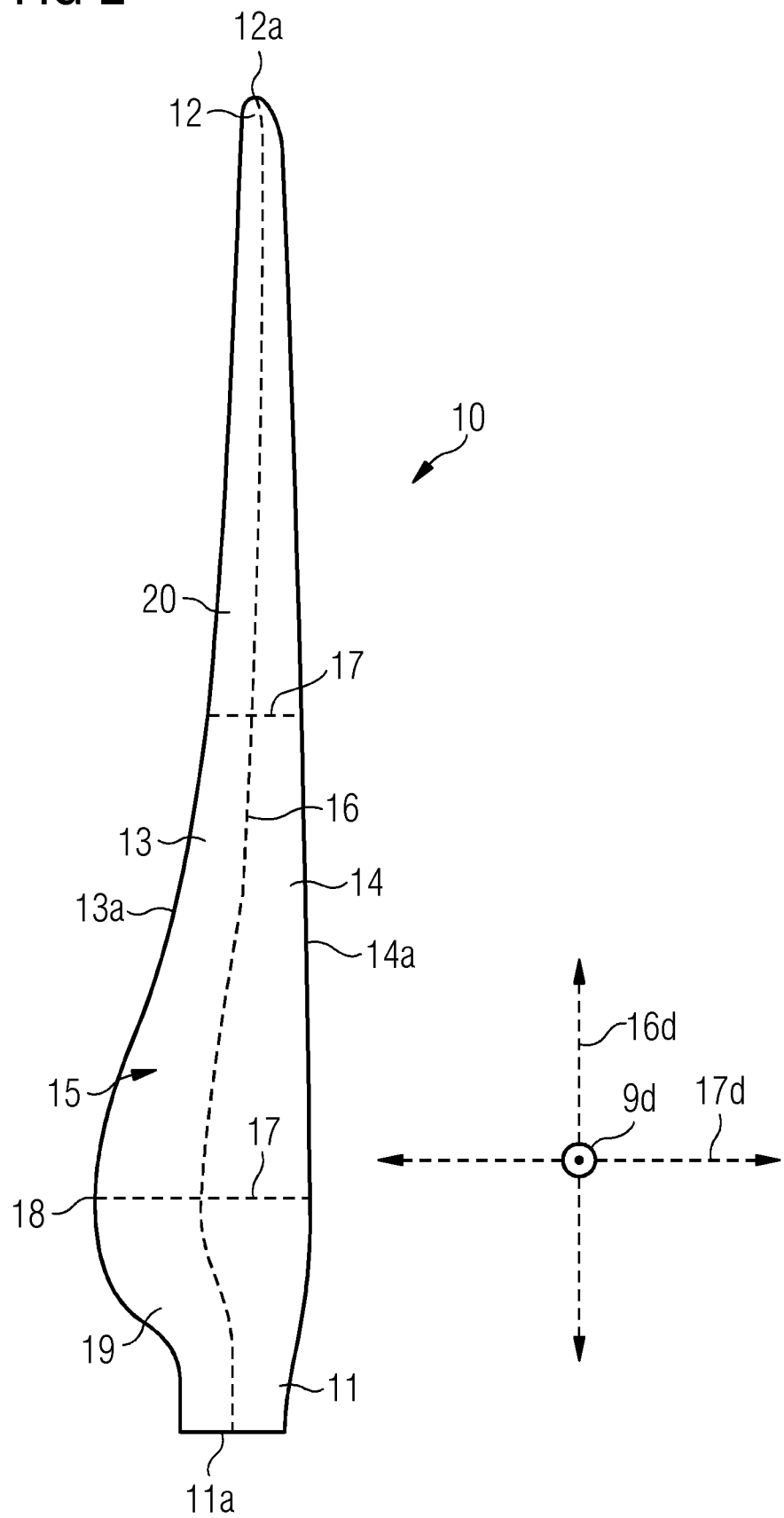
Figure 3:
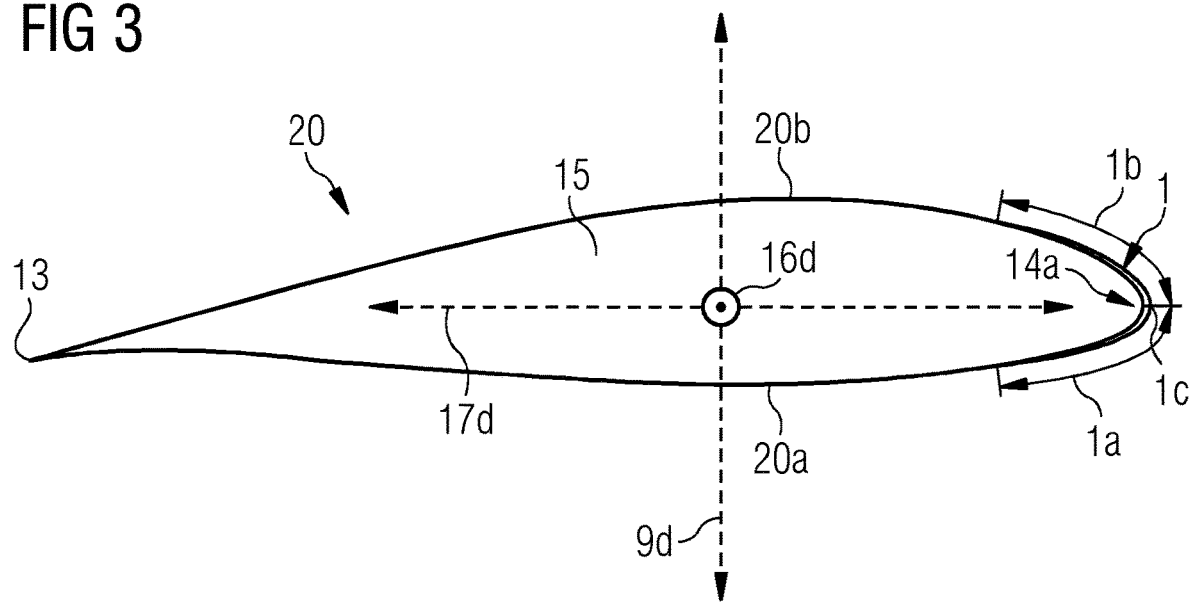
Figure 4:
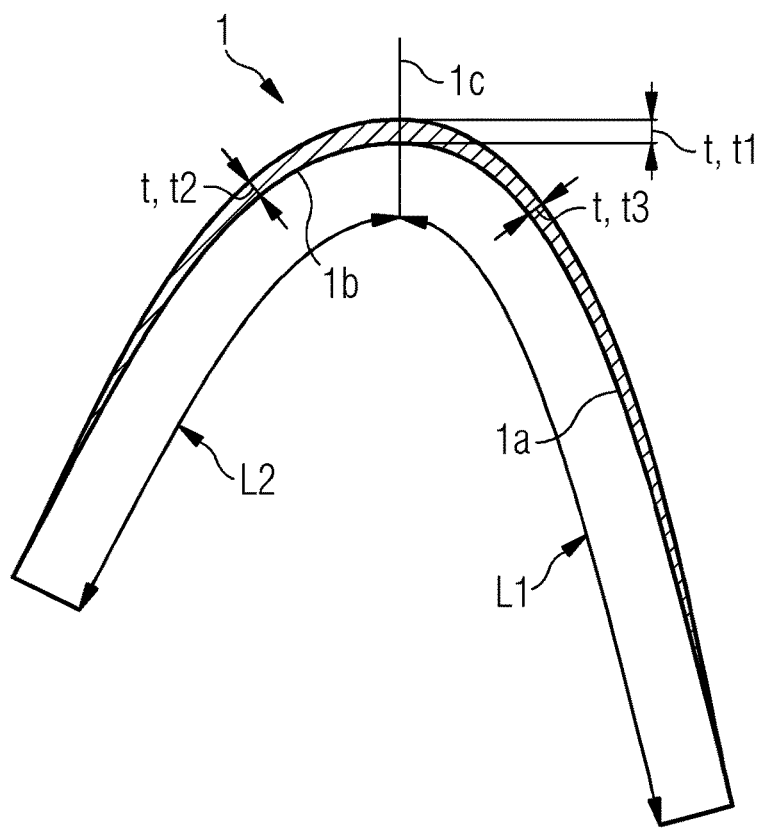
Figure 5:
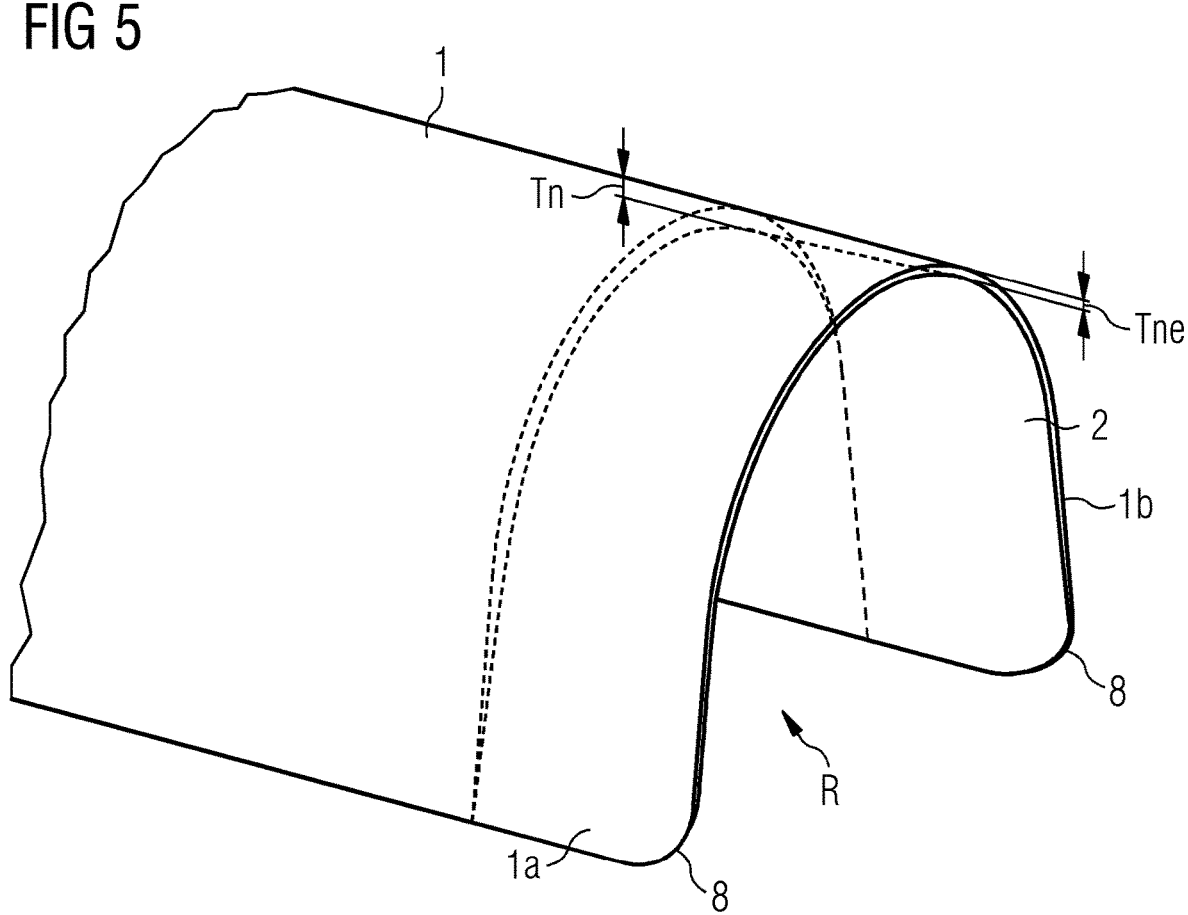
Figure 6:
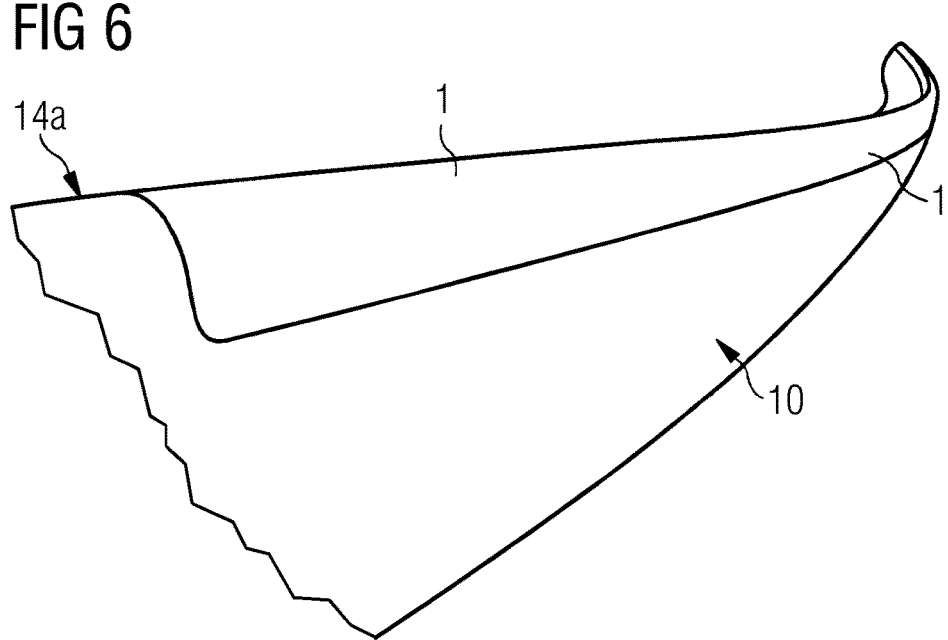

Some of the embodiments will be described in detail, with references to the following Figures, wherein like designations denote like members, wherein:

FIG. 1 schematically depicts a wind turbine having a wind turbine rotor blade in which a protective cover of the present technique may be incorporated;

FIG. 2 schematically depicts the wind turbine rotor blade in which the protective cover of the present technique may be incorporated;

FIG. 3 schematically depicts a cross-sectional view of an exemplary embodiment of the airfoil of a turbine blade mounted with the protective cover of the present technique;

FIG. 4 schematically depicts a cross-sectional view of the protective cover of FIG. 3 of the present technique;

FIG. 5 schematically depicts a perspective view of an exemplary embodiment the protective cover of the present technique; and FIG. 6 schematically depicts a perspective view of a part of an exemplary embodiment of a wind turbine rotor blade with the protective cover of the present technique.

DETAILED DESCRIPTION

Hereinafter, above-mentioned and other features of the present technique are described in detail. Various embodiments are described with reference to the drawing, wherein like reference numerals are used to refer to like elements throughout. In the following description, for the purpose of explanation, numerous specific details are set forth in order to provide a thorough understanding of one or more embodiments. It may be noted that the illustrated embodiments are intended to explain, and not to limit embodiments of the invention. It may be evident that such embodiments may be practiced without these specific details.

It may be noted that in the present disclosure, the terms "first", "second", "third" etc. are used herein only to facilitate discussion, and carry no particular temporal, spatial or chronological significance unless otherwise indicated.

FIG. 1 shows an exemplary embodiment of a wind turbine 100 of the present technique. The wind turbine 100 includes a tower 120, which is mounted on a fundament (not shown). A nacelle 122 is mounted on top of the tower 120 and rotatable with regard to the tower 120 by means of a yaw angle adjustment mechanism 121 such as yaw bearings and yaw motors. The yaw angle adjustment mechanism 121 functions to rotate the nacelle 122 around a vertical axis (not shown) referred to as a yaw axis, which is aligned with the longitudinal extension of the tower 120. The yaw angle adjustment mechanism 121 rotates the nacelle 122 during operation of the wind turbine 100 to ensure that the nacelle 122 is appropriately aligned with the current wind direction to which the wind turbine 100 is subjected.

The wind turbine 100 further includes a rotor 110 having at least a rotor blade 10, and generally three rotor blades 10, although in the perspective view of FIG. 1 only two rotor blades 10 are visible. One of the rotor blades 10 is graphically depicted in FIG. 2. The rotor 110 is rotatable around a rotational axis 110a. The rotor blades 10, hereinafter also referred to as the blades 10 or as the blade 10 when referring to one of the blades 10, are generally mounted at a driving collar 112, also referred to as a hub 112. The hub 112 is mounted rotatable with regard to the nacelle 122 by means of a main bearing (not shown). The hub 112 is rotatable about the rotational axis 110a. Each of the blades 10 extends radially with respect to the rotational axis 110a and has an airfoil section 20.

In between the hub 112 and each of the rotor blades 10, is provided a blade adjustment mechanism 116 to adjust the blade pitch angle of the blade 10 by rotating the respective blade 10 about a longitudinal axis (not shown) of the blade 10. The longitudinal axis of each of the blade 10 is aligned substantially parallel with the longitudinal extension of the respective blade 10. The blade adjustment mechanism 116 functions to adjust blade pitch angles of the respective blade 10.

The wind turbine 100 includes a main shaft 125 that rotatably couples the rotor 110, particularly the hub 112, to a generator 128 housed within the nacelle 122. The hub 112 is connected to a rotor of the generator 128. In an exemplary embodiment (not shown) of the wind turbine 100, the hub 112 is connected directly to the rotor of the generator 128, thus the wind turbine 100 is referred to as a gearless, direct drive wind turbine 100. As an alternative, as shown in the exemplary embodiment of FIG. 1, the wind turbine 100 includes a gear box 124 provided within the nacelle 122 and the main shaft 125 connects the hub 112 to the generator 128 via the gear box 124, thereby the wind turbine 100 is referred to as a geared wind turbine 100. The gear box 124 is used to convert the number of revolutions of the rotor 110 into a higher number of revolutions of the main shaft 125, and consequently of the rotor of the generator 128. Furthermore, a brake 126 is provided to stop the operation of the wind turbine 100 or to reduce the rotational speed of the rotor 110 for instance in case of a very strong wind and/or in case of an emergency.

The wind turbine 100 further includes a control system 150 for operating the wind turbine 100 at desired operational parameters, for example at a desired yaw angle, with a desired blade pitch, at a desired rotational speed of the rotor 110, and so on and so forth. The controlling and/or adjusting of the operational parameters are performed to obtain an optimized power generation under the existent conditions for example under existent wind conditions and other weather conditions.

The wind turbine 100 may further include different sensors for example a rotational speed sensor 143, a power sensor 144, angle sensors 142, etc. that provide inputs to the control mechanism 150 or other components of the wind turbine 100 to optimize operation of the wind turbine 100.

Furthermore, as shown in FIG. 2, the rotor blade 10 includes a root section 11 having a root 11a and an airfoil section 20. Generally, the rotor blade 10 includes a transition section 19 in between the root section 11 and the airfoil section 20. The airfoil section 20, hereinafter also referred to as the airfoil 20, includes a tip section 12 having a tip 12a. The root 11a and the tip 12a are separated by a span 16, of the rotor blade 10, which follows the shape of the rotor blade 10. A direction along or parallel to the span 16 is referred to as span-wise direction 16d. The tip section 12, including the tip 12a therein, extends from the tip 12a towards the root 11a up to a span-wise position of approx. 33.3% (percent), i.e. one third of the total length of the blade 10, as measured from the tip 12a. The tip 12a extends within the tip section 12 towards the root 11a up to a span-wise position of approx. one meter. The rotor blade 10 includes a leading-edge section 14 having a leading-edge 14a, and a trailing edge section 13 having a trailing edge 13a. The trailing edge section 13 surrounds the trailing edge 13a. Similarly, the leading-edge section 14 surrounds the leading-edge 14a.

At each span-wise position perpendicular to the span 16, a chord line 17 that connects the leading-edge 14a and the trailing edge 13a can be defined. A direction along or parallel to the chord line 17 is referred to as chord-wise direction 17d. FIG. 2 depicts two such chord lines 17 at two different span-wise positions. Furthermore, a direction mutually perpendicular to the span-wise direction 16d and to the chord-wise direction 17d is referred to as a flap-wise direction 9d. The rotor blade 10 has a shoulder 18 that is a section of the rotor blade 10 where the chord line 17 has maximum chord length, i.e. in example of FIG. 2 at the chord line 17 that is depicted towards the root 11a.

In the wind turbine 100, one or more of the blades 10 may include one or more spar caps (not shown) positioned inside a shell (not shown) of the wind turbine rotor blade 10. The shell may have the so-called 'structural shell design' (not shown) in which the one or more spar caps are integrated within the structure of the shell. The blade 10 of the wind turbine 100 may have a 'butterfly blade' construction having leeward and windward shells that are separately manufactured and then joined together to form the blade 10, or may have the well-known 'integral blade' construction of Siemens, where unlike butterfly blade construction the leeward and windward shells are not separately manufactured. In the integral blade construction, the entire shell is manufactured in one-part as an integral shell and thus does not have a separately manufactured leeward and windward side.

A protective shell 1 or a protective cover 1 of the present technique, as shown in FIGS. 3 to 6 and as described hereinafter, is used with the aforementioned blade 10 of FIG. 2 which may be part of the aforementioned wind turbine 100 of FIG. 1.

The protective cover 1 is used for mounting on the leading-edge 14a of the wind turbine rotor blade 10. FIG. 3 shows a cross-section of the airfoil 20 of the blade 10 wherein the protective cover 1 has been mounted. The protective cover 1 has a pre-formed curved shape as depicted in FIG. 5. The pre-formed curved shape defines a space R for receiving and accommodating at least a part of the leading-edge section 14 including the leading-edge 14a of the wind turbine rotor blade 10 that is to be protected by the protective cover 1. As shown in FIGS. 3 to 5, the protective cover 1 includes a pressure side section 1a that is to be positioned on the pressure side 20a of the blade 10, a suction side section 1b that is to be positioned on the suction side 20b of the blade 10, and a centerline 1c in-between the pressure side section 1a and the suction side section 1b of the protective cover 1. It may be noted that the centerline 1c is not formed explicitly as a line but in fact it is an imaginary line where the pressure side section 1a and the suction side section 1b of the protective cover 1 meet. The protective cover 1 extends longitudinally i.e. the protective cover 1 has a shape which extends along the spanwise direction 16d as depicted in FIG. 2 of the blade 10. The centerline 1c of the protective cover 1 runs along the longitudinal direction of the protective cover 1.

According to the present technique, thickness t, shown in FIG. 4, of the protective cover 1 in a cross section of the protective cover 1 in transverse direction has a thickness distribution corresponding to a standardized normal distribution. FIG. 4 shows three locations of measurement of the thickness t of the protective cover 1, namely t1, t2, t3, for exemplary purposes. The thickness, of which t1,t2,t3 are examples, along different positions in the cross-section of the protective cover 1 in transverse direction correspond to a standardized normal distribution i.e. Gaussian distribution. The protective cover 1 has a thickness distribution according to the following normal distribution (a composed exponential function) that represents the thickness of the protective cover 1, and hence the material addition to the leading-edge section 14 of the blade 10 when the protective cover 1 is positioned on the blade 10:

$$t(s) = t_0 \cdot e^{-\frac{(s-\mu_s)^2}{2\sigma_s^2}}$$

wherein,
s represents the arclength of the blade section
$t_0$ represents peek thickness,
$\mu_s$ represents mean of the distribution, and
$\sigma_s$ represents standard deviation.

The advantage of choosing the normal distribution is its mathematical simplicity and deterministic behavior making it computationally efficient and maintaining relatively good shape adaptability. Only variables are varied during the optimization—the peek thickness ($\alpha$), the mean value ($\mu$) representing the peak position with respect to the leading-edge 14a and the standard deviation ($\sigma$) driving the width/bluntness of the thickness of the protective cover 1.

As is shown in FIG. 5, the thickness distributions for different longitudinal positions of the protective cover 1, which correspond to different spanwise positions of the blade 10 when the protective cover 1 is mounted on the blade 10, are different. Example for varying thicknesses at same relative positions with respect to the centerline 1c within different thickness distributions at two different longitudinal positions of the protective cover 1 have been depicted in FIG. 5 with thicknesses Tn and Tne.

In an exemplary embodiment of the protective cover 1, the thickness distribution corresponds to a standardized normal distribution with non-zero skewness i.e. a generalized normal distribution is used, including skewness ($\kappa$) as a fourth variable for additional flexibility in the shape of the protective cover 1. This allows asymmetry with respect to the mean value i.e. a non-symmetric thickness distribution of the protective cover 1, wherein the thicker part is towards the pressure side in a preferred embodiment of the protective cover 1. Such a normal distribution may be represented by the following equation:

$$t(s) = t_0 \cdot \exp\left(\frac{-y^2}{2}\right), \text{ where } y = \begin{cases} \frac{-1}{\kappa_s}\log\left(1 - \kappa_s\left(\frac{s-\mu_s}{\sigma_s}\right)\right) & \kappa_s \neq 0 \\ \frac{s-\mu_s}{\sigma_s} & \kappa_s = 0 \end{cases}$$

wherein,
s represents the arclength of the blade section
$t_0$ represents peek thickness,
$\mu_s$ represents mean of the distribution, and
$\sigma_s$ represents standard deviation.
$\kappa_s$ represents the skewness factor.

It may be appreciated by one skilled in the art that the abovementioned equation also covers the case of the simplified Guassian distribution, when skewness (Ks) is 0 (zero).

Owing to variation in the thicknesses, in the pressure side section 1a and the suction side section 1b of the protective cover 1, for measurement points having the same distance from the centerline 1c, the protective cover 1 the present technique has different arc lengths pressure L1, L2 for pressure side section 1a and the suction side section 1b as shown in FIG. 4.

The protective cover 1 may be formed of polymer material such as Polyurethane, Epoxy, Polyester, Polycarbonate, Polyacrylate, etc. The protective cover 1 may be formed from an elastomeric material, for example Polyurethane, Epoxy, Polyester, Polycarbonate, Polyacrylate, etc. Protective cover 1 formed from an Elastomeric Polyurethane are preferred providing elastic and flexible properties to the protective cover 1 and thus allowing the protective cover 1 to be easily form-fitted to a wind turbine blade surface 10 and to provide it with sufficient elasticity to dampen the impact of erosive influences.

FIG. 6 graphically depicts an exemplary embodiment of the protective cover 1 of the present technique that has been mounted on a part of the wind turbine blade 10. It may be noted that the protective cover 1 of the present technique may extend only partially in the spanwise direction 16d and thus partially cover the leading-edge 14a of the wind turbine blade 10 as shown in FIG. 6, or the protective cover 1 of the present technique may extend in the spanwise direction 16d such that it covers the leading-edge 14a of the wind turbine blade 10 entirely (not shown).

The present technique also presents a method for manufacturing a protective cover 1. The protective cover 1 to be manufactured is as described hereinabove in reference to FIGS. 1 to 6. In the method, the protective cover 1 is formed into a curved shape so as to accommodate at least a part of a leading-edge section 14 including the leading-edge 14a of the wind turbine rotor blade 10 to be protected, the protective cover 1 is formed having the pressure side section 1a, the suction side section 1b and the centerline 1c in-between the pressure side section 1a and the suction side section 1b as described in reference to FIGS. 1 to 6. The protective cover 1 is formed such that thickness t of the protective cover 1 in a cross section of the protective cover 1 in transverse direction has a thickness distribution corresponding to a standardized normal distribution, as described hereinabove with respect to FIGS. 1 to 6.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

The invention claimed is:

1. A protective cover for a leading-edge of a wind turbine rotor blade, the protective cover being pre-formed into a curved shape so as to accommodate at least a part of a leading-edge section including the leading-edge of the wind turbine rotor blade to be protected, the protective cover comprising:
    a pressure side section;
    a suction side section; and
    a centerline in-between the pressure side section and the suction side section, the centerline running in a longitudinal direction of the protective cover,
    wherein a thickness of the protective cover in a cross section of the protective cover in a transverse direction has a thickness distribution corresponding to a standardized normal distribution, such that the thickness varies between a first longitudinal position and a second longitudinal position of the protector cover corresponding to two different spanwise positions along the wind turbine rotor blade, wherein the two different spanwise positions are equidistant from the centerline.

2. The protective cover according to claim 1, wherein the thickness distribution corresponds to a standardized normal distribution with non-zero skewness.

3. The protective cover according to claim 2, wherein the pressure side section is comparatively thicker than the suction side section for measurement points having a same distance from the centreline.

4. The protective cover according to claim 1, wherein the protective cover comprises a polymer.

5. The protective cover according to claim 1, wherein the protective cover comprising an elastomer.

6. A wind turbine rotor blade comprising the protective cover of claim 1.

7. The wind turbine rotor blade according to claim 6, wherein the protective cover is glued onto the leading-edge section of the wind turbine rotor blade.

8. A wind turbine comprising a wind turbine rotor blade, wherein the wind turbine rotor blade comprises a protective cover according to claim 1.

9. A method for manufacturing a protective cover for a leading-edge of a wind turbine rotor blade, the method comprising:
    forming the protective cover into a curved shape so as to accommodate at least a part of a leading-edge section including the leading-edge of the wind turbine rotor blade to be protected, the protective cover comprising a pressure side section, a suction side section, and a centerline in-between the pressure side section and the suction side section, the centerline running in a longitudinal direction of the protective cover, wherein the protective cover is formed such that a thickness of the protective cover in a cross section of the protective cover in a transverse direction has a thickness distribution corresponding to a standardized normal distribution, such that the thickness varies between a first longitudinal position and a second longitudinal position of the protector cover corresponding to two different spanwise positions along the wind turbine rotor blade, wherein the two different spanwise positions are equidistant from the centerline.

10. The method according to claim 9, wherein the thickness distribution corresponds to a standardized normal distribution with non-zero skewness.

11. The method according to claim 9, wherein the protective cover is formed such that the pressure side section of the protective cover is comparatively thicker than the suction side section of the protective cover for measurement points having a same distance from the centreline of the protective cover.

12. The method according to claim 9, wherein the protective cover comprises a polymer.

13. The method according to claim 9, wherein the protective cover comprises an elastomer.

* * * * *